United States Patent [19]

Nishio et al.

[11] Patent Number: 5,112,907
[45] Date of Patent: May 12, 1992

[54] THERMOPLASTIC RESIN COMPOSITION

[75] Inventors: Taichi Nishio; Hideyuki Kuribayashi; Takashi Sanada, all of Chiba, Japan

[73] Assignee: Sumitomo Chemical Co., Ltd., Osaka, Japan

[21] Appl. No.: 431,822

[22] Filed: Nov. 6, 1989

Related U.S. Application Data

[62] Division of Ser. No. 113,471, Oct. 28, 1987, abandoned.

[30] Foreign Application Priority Data

Oct. 31, 1986 [JP] Japan .................. 61-260985

[51] Int. Cl.$^5$ .................. C08L 71/12; C08L 77/02
[52] U.S. Cl. .................. 525/65; 525/63; 525/66; 525/68; 525/905
[58] Field of Search ............ 525/65, 905, 66, 68, 525/63

[56] References Cited

U.S. PATENT DOCUMENTS

| | | |
|---|---|---|
| 4,315,086 | 2/1982 | Ueno et al. |
| 4,659,763 | 4/1987 | Gallucci et al. |
| 4,839,425 | 6/1989 | Mawatari et al. ............ 525/905 |
| 4,873,276 | 10/1989 | Fujii et al. |

FOREIGN PATENT DOCUMENTS

| | | |
|---|---|---|
| 0024120 | 2/1981 | European Pat. Off. |
| 164767 | 12/1985 | European Pat. Off. |
| 182163 | 5/1986 | European Pat. Off. |
| 0184151 | 6/1986 | European Pat. Off. |
| 0231626 | 8/1987 | European Pat. Off. |
| 0244090 | 11/1987 | European Pat. Off. |
| 0268280 | 5/1988 | European Pat. Off. |
| 56-47431 | 4/1981 | Japan . |
| 56-49753 | 5/1981 | Japan . |
| 60-11966 | 3/1985 | Japan . |
| 61-120855 | 6/1986 | Japan . |
| 61-204261 | 9/1986 | Japan . |
| 61-296061 | 12/1986 | Japan . |
| 62-81449 | 4/1987 | Japan . |
| WO87/05304 | 9/1987 | World Int. Prop. O. |

Primary Examiner—Jacob Ziegler
Attorney, Agent, or Firm—Cushman, Darby & Cushman

[57] ABSTRACT

A novel thermoplastic resin composition excellent in heat resistance, impact resistance, hardness is provided which comprises 100 parts by weight of a composition comprising (A) 5-95% by weight of a polyphenylene ether prepared by oxidation polymerization of at least one phenol compound represented by the formula:

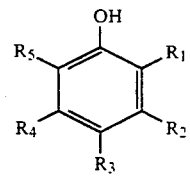

wherein $R_1$, $R_2$, $R_3$, $R_4$ and $R_5$ which may be identical or different and represent a hydrogen atom, a halogen atom, a substituted or unsubstituted hydrocarbon residue, with a proviso that at least one of them is a hydrogen atom and (B) 95-5% by weight of a polyamide and 5-100 parts by weight of (C) a copolymer of an ethylene-α-olefin copolymer rubber with an alkenyl aromatic compound and an unsaturated carboxylic acid or its anhydride. This composition may further contain 0.01-30 parts by weight of an epoxy compound (D) for 100 parts by weight of the composition of (A) and (B).

15 Claims, No Drawings

THERMOPLASTIC RESIN COMPOSITION

This is a division of application Ser. No. 07/113,471, filed Oct. 28, 1987, now abandoned.

This invention relates to a resin composition comprising a polyphenylene ether and a polyamide.

More particularly, it relates to a novel thermoplastic resin composition superior in heat resistance, mechanical properties and processability which comprises a resin composition comprising a polyphenylene ether and a polyamide, to which is added a copolymer of an ethylene-α-olefin copolymer rubber, an alkenyl aromatic compound and an unsaturated carboxylic acid or its anhydride or to which is further added an epoxy compound.

The composition of this invention is utilized as shaped articles, sheets or films made by injection molding and extrusion molding.

Polyphenylene ether is a thermoplastic resin superior in various mechanical properties, heat resistance, electrical properties, chemical resistance, hot water resistance, flame resistance and dimension stability, but inferior in processability due to high melt viscosity and relatively inferior in impact resistance.

A composite material comprising polyphenylene ether and and polystyrene is proposed in order to lessen melt viscosity of polyphenylene ether and to improve processability thereof, leaving various other good properties of polyphenylene ether unchanged. However, such inherent good properties of polyphenylene ether as heat resistance, flame resistance and chemical resistance are somewhat damaged when enough polystyrene is added to provide practical processability. No sufficient improvement is seen in impact resistance, either, even after polystyrene is added.

On the other hand, polyamide is a thermoplastic resin, characterized by its heat resistance, stiffness, strength, oil resistance, etc., but inferior in processability and impact resistance and besides high in water absorption and great in changes of properties and dimension in practical use. Thus, further improvements have been desired.

Development is expected in new applications if a resin composition is prepared in which polyphenylene ether and a polyamide are blended, maintaining favorite properties of both components and having improved processability and impact strength. However, polyphenylene ether and polyamide are greatly different in melt viscosity from each other and they are very poor in compatibility. Simple, blending of them encounters the following difficulties:

1. hardness in stable take-up of strands extruded and greatly lower processability in molding, because their melt viscosity difference is very large; and 2. no improvement in mechanical properties of the shaped articles, particularly in impact resistance, but rather lower than expected on the basis of their respective values.

One approach to solve these problems is addition of additives having reactivity of compatibility to system of polyphenylene ether and polyamide as disclosed in Japanese Patent Publication (Kokoku) No. 60-11966 and Japanese Patent Publication (Kokai) Nos, 56-47432, 57-10642 and 60-58463. Especially, the methods disclosed in Japanese Patent Publication (Kokoku) No. 60-11966 and Japanese Patent Publication (Kokai) No. 56-47432 afford good effect, but impact strength is still not enough.

Furthermore, Japanese Patent Publication (kokai) Nos. 56-49753, 57-10642, 57-165448 and 59-66452 disclose the use of reactive additives with modified polystyrene, polyphenylene ether or rubber. Such composition is out of balance between impact resistance and heat resistance and besides improvement of impact resistance is still not sufficient.

After a study on a resin composition of polyphenylene ether and polyamide, we have found that a resin composition high in fluidity when melted, namely, good in processability and having good balance between impact strength and heat resistance is obtained by blending with a composition comprising a polypenylene ether and a polyamide, a copolymer of ethylene-α-olefin copolymer rubber, an alkenyl aromatic compound and an unsaturated carboxylic acid or its anhydride or furthermore an epoxy compound.

That is, this invention relates to a thermoplastic resin composition which comprises 100 parts by weight of a resin composition comprising (A) 5-95% by weight of a polyphenylene ether obtained by oxidation polymerization of one or more phenol compounds represented by the formula:

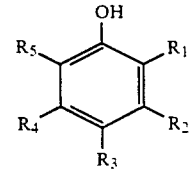

wherein $R_1$, $R_2$, $R_3$, $R_4$ and $R_5$ which may be identical or different and represent a hydrogen atom, a halogen atom or a substituted or unsubstituted hydrocarbon residue with a proviso that at least one of them is a hydrogen atom and (B) 95-5% by weight of a polyamide and (C) 5-100 parts by weight of a copolymer of an ethylene-α-olefin copolymer rubber, an alkenyl aromatic compound and an unsaturated carboxylic acid or its anhydride or additionally (D) 0.01-30 parts by weight of an epoxy compound based on 100 parts by weight of the composition of (A) and (B).

Polyphenylene ether for (A) is a polymer obtained, for example, by oxidation polymerization of one or more of phenol compounds having the formula:

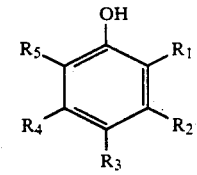

wherein $R_1$, $R_2$, $R_3$, $R_4$ and $R_5$ which may be identical or different and represent a hydrogen atom, a halogen atom or a hydrocarbon residue substituted or not and at least one of them is a hydrogen atom, with molecular oxygen or gas containing the same in the presence of an oxidation coupling catalyst.

Examples of $R_1$-$R_5$ are a hydrogen atom, halogen atoms such as a chlorine atom, a bromine atom, a fluorine atom and an iodine atom, substituted or unsubstituted hydrocarbon residues of 1-18 carbon atoms, for example, alkyl groups or substituted alkyl groups such as a methyl group, an ethyl group, an n- or iso-propyl group, a pri.-, sec.- or tert.-butyl group, a chloroethyl group, a hydroxyethyl group, a phenylethyl group, a hydroxymethyl group, a carboxyethyl group, a methoxycarbonylethyl group, a cyanoethyl group, aryl or substituted aryl groups such as a phenyl group, a chlorophenyl group, a methylphenyl group, a dimethylphenyl group an ethylphenyl group, a benzyl group or an allyl group.

Examples of phenol compound are phenol, o-, m- or p-cresol, 2,6-, 2,5-, 2,4- or 3,5-dimethylphenol, 2-methyl-6-phenylphenol, 2-6-diphenylphenol, 2,6-diethylphenol, 2-methyl-6-ethylphenol, 2,3,5-, 2,3,6- or 2,4,6-trimethylphenol, 3-methyl-6-t. butylphenol, thymol and 2-methyl-6-allylphenol. Alternatively, copolymer of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolack resin.

Preferably polymers are homopolymer of 2,6-dimethylphenol or 2,6-diphenylphenol and copolymers of a large amount of 2,6-xylenol and a small amount of 3-methyl-6-t-butylphenol or of 2,3,6-trimethylphenol.

Any oxydation coupling catalyst may be employed for oxidation polymerization of phenol compound, as long as it has polymerization ability. Examples are cuprous compound/tert. amine such as cuprous chloride/triethylamine and cuprous chloride/pyridine; cupric compound/amide/alkali metal hydroxide such as cupric chloride/pyridine/potassium hydroxide; manganese salt/primary amine such as manganese chloride/ethanolamine and manganese acetate/ethylenediamine; manganese salt/alcolate or phenolate such as manganese chloride/sodium methylate and manganese chloride/sodium phenolate; and cobalt salt/tert. amine.

Polymerization temperatures for preparing polyphenylene ether is 40° C. or higher (high temperature polymerization) or lower (low temperature polymerization). Either temperature may be used, although polymers produced thereby have different properties.

Polyphenylene ether for (A) further includes that grafted with styrenic polymer or other polymer. For instance, grafted one is obtained by graft-polymerizing styrene monomer and/or other comonomer in the presence of polyphenylene ether and organic peroxide (Japanese Patent Publications (Kokoku) 47-47862, 48-12197, 49-5623, 52-38596 and 52-30991) or by melt-kneading polyphenylene ether and polystyrene in the presence of a radical initiator (Japanese Patent Publication (Kokai) 52-142799).

As the polyamides (B), there may be used those obtained by polycondensation of lactams of three or more membered rings, polymerizable ω-amino acids, dibasic acids with diamines, etc. As typical examples thereof, mention may be made of polymers of ε-caprolactam, aminocaproic acid, enantholactam, 7-aminoheptanoic acid, 11-aminoundecanoic acid, etc., polymers obtained by polycondensation of diamines such as hexamethylenediamine, nonamethylenediamine, undecamethylenediamine, dedecamethylenediamine, m-xylylenediamine, etc. with dicarboxylic acids such as terephthalic acid, isophthalic acid, adipic acid, sebacic acid, dibasic dodecanoic acid, glutaric acid, etc., or copolymers thereof.

Typical examples of said polyamides are aliphatic polyamides such as polyamide 6, polyamide 6,6, polyamide 6,10, polyamide 11, polyamide 12, polyamide 6,12, etc. and aromatic polyamides such as polyhexamethylenediamine terephthalamide, polyhexamethylenediamine isophthalamide, xylene group-containing polyamides, etc. These may also be used as mixtures or copolymers of two or more of them.

Mixing ratio of polyphenylene ether (A) and polyamide (B) is suitably 5-95% by weight of (A) and 95-5% by weight of (B). When polyamide (B) is less than 5% by weight, solvent resistance and processability are not sufficiently improved and when (B) is more than 95% by weight, thermal properties such as heat distortion temperature are deteriorated.

The copolymer (C) of ethylene-α-olefin copolymer rubber, alkenyl aromatic compound and unsaturated carboxylic acid or its anhydride is a copolymer rubber obtained by allowing an ethylene-α-olefin copolymer rubber to react with an alkenyl aromatic compound and an unsaturated carboxylic acid or its anhydride in an organic solvent at 60-150° C. in the presence of a radical polymerization initiator and in the substantial absence of oxygen.

The copolymer (C) of ethylene-α-olefin copolymer rubber, alkenyl aromatic compound and unsaturated carboxylic acid or its anhydride is used, since they are well compatible with the composition of polyphenylene ether (A) and polyamide (B) and besides have a remarkable effect of improvement in impact strength. Compatibilization is insufficient and improvement of impact strength is poor, without unsaturated carboxylic acid or its anhydride. Further the use of alkenyl aromatic compound in combination prevents reduction of fluidity. Addition amount of the unsaturated carboxylic acid or its anhydride to ethylene-α-olefin copolymer rubber is preferably 0.3-5 parts by weight. An amount of unsaturated carboxylic acid or its salt used for preparation of the copolymer is preferably 0.5-20% by weight of ethylene-α-olefin copolymer rubber and weight ratio of alkenyl aromatic compound/unsaturated carboxylic acid or its anhydride is preferably 0.2-5% by weight.

This modified copolymer rubber is used preferably in an amount of 5-100 parts by weight, more preferably in an amount of 10-30 parts by weight for 100 parts of composition comprising polyphenylene ether (A) and polyamide (B). When less than 5 parts by weight, improvement of impact resistance is not sufficient and when more than 100 parts by weight, balance between the impact resistance and other properties such as heat resistance is lost.

Ethylene-α-olefin copolymer rubbers are, for example, ethylene-propylene copolymer rubber, ethylene-butene-1 copolymer rubber, ethylene-propyleneethylidenenorbornene copolymer rubber, ethylene-propylene-dicyclopentadiene copolymer rubber, ethylene-propylene-1,4,-hexadiene copolymer rubber, ethylene-butene-1-ethylidenenorbornene copolymer rubber, ethylene-butene-1-dicyclopentadiene copolymer rubber and ethylene-butene-1-1,4-hexadiene copolymer rubber. These modified ethylene-α-olefin copolymer rubbers may be produced by various methods such as solution method, bulk method, etc.

Organic solvents used for the solution method are preferably those in which all of said copolymer rubber, unsaturated dicarboxylic acid or its anhydride and radical polymerization initiator are dissolved at reaction temperature and, for example, aromatic hydrocarbons such as toluene, xylene and ethylbenzene are preferably used and besides those which contain a small amount of polar solvents or aliphatic hydrocarbons such as acetone, methyl ethyl ketone, terahydrofuran, hexane and heptane may also be used.

Reaction temperature which may vary depending on the radical polymerization initiator is usually 60–150° C., preferably 70–130° C. Grafting reaction at a reaction temperature of higher than 150° C. causes much gelation of reactants and little product of desired properties and that at a temperature lower than 60° C. prevents the grafting reaction. In the case of bulk method, the desired products may also be obtained by melt kneading of styrene, maleic anhydride and a peroxide with an ethylene-α-olefin rubber.

Unsaturated carboxylic acid or its anhydride used for modification is, for example, maleic acid, maleic anhydride, fumaric acid, fumaric anhydride, methylnadic anhydride, dichloromaleic anhydride, acrylic acid, butenoic acid, crotonic acid, vinyl acetic acid, methacrylic acid, pentenoic acid, angelic acid, tiglic acid, 2-pentenoic acid, 3-pentenoic acid, α-ethyl-acrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9-12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleosteric acid, oleic acid, eicosapentaenic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid and anhydrides thereof. Of these compounds, especially preferred is maleic anhydride which is especially high in reactivity.

Styrene is most preferred as alkenyl aromatic compound, but o-methylstyrene, p-methylstyrene, m-methylstyrene, α-methylstyrene may also be used. Mixtures of them may also be used.

An amount of alkenyl aromatic compound for 1 part by weight of unsaturated carboxylic acid or its anhydride is 0.2–5 parts by weight, preferably 0.5–3 parts by weight. When amount of alkenyl aromatic compound is less than 0.2 part by weight, no effects are seen on prevention of gelation and on increase in amount of grafting reaction and when more than 5 parts by weight, further preferable effects are hardly expected. Total amount of unsaturated carboxylic acid or its anhydride and alkenyl aromatic compound is 0.5–20% by weight of ethylene-α-olefin copolymer rubber.

The use of a compound containing unsaturated carboxylic acid or its anhydride is preferable, since compatibility between polyphenylene ether and polyamide is improved and products of good properties are obtained. However, when this compound is introduced into ethylene-α-olefin copolymer rubber, gel is often formed. If products containing gel are used, effects for improvement of properties, especially impact strength are diminished. It has been found that the use of an alkenyl aromatic compound in combination therewith results in prevention of formation of gel and improvement of fluidity when melted. Thus, this invention has been accomplished.

Ethylene-α-olefin copolymer rubber high in content of unsaturated carboxylic acid or its anhydride free from gel has markedly superior properties and systems in which an alkenyl aromatic compound is further added are better in fluidity when melted than those which contain no alkenyl aromatic compound. These are key points of this invention.

Epoxy compound (D) includes epoxy resin and epoxy group-containing copolymer. Examples of epoxy resin are bisphenol A epoxy resin, o-cresol novolac epoxy resin, glycidylamine epoxy resin, three-functional epoxy resin and four-functional epoxy resin. The epoxy compound may further contain a reactive diluent.

Epoxy group-containing copolymer includes, for example, unsaturated epoxy compound/ethylenically unsaturated compound copolymer, epoxidized polyester and epoxidized polyamide. Of these copolymers, unsaturated epoxy compound/ethylenically unsaturated compound copolymer is preferred and especially preferred is a copolymer comprising unsaturated epoxy compound, ethylene and ethylenically unsaturated compound excluding ethylene. Unsaturated epoxy compound used for the unsaturated epoxy compound/ethylenically unsaturated compound copolymer has in a molecule both an epoxy group and an unsaturated group which is copolymerizable with the ethylenically saturated compound, for instance, unsaturated glycidyl ester and unsaturated glycidyl ether having the formulas (1) and (2) below:

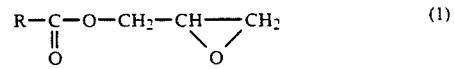

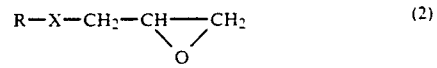

wherein R is a $C_2$–$C_{18}$ hydrocarbon group containing ethylenically unsaturated bond and X is —$CH_2$—O— or

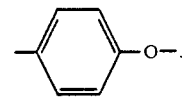

Examples are glycidyl acrylate, glycidyl methacrylate, glycidyl itaconate, allyglycidyl ether, 2-methylallyl glycidyl ether, styrene-p-glycidyl ether. The ethylenically unsaturated compound is olefin, vinyl ester of $C_2$–$C_6$ saturated carboxylic acid, $C_1$–$C_8$ saturated alcohol/acrylic or methacrylic acid ester, meleate, methacrylate, fumarate, halogenated vinyl, styrene, nitrile, vinyl ether or acrylamide. Examples are ethylene, propylene, butene-1, vinyl acetate, methyl acrylate, ethyl acrylate, methyl methacrylate, diethyl malate, diethyl fumarate, vinyl chloride, vinylidene chloride, styrene, acrylonitrille, isobutyl vinyl ether and acrylamide. They are used singly or in a mixture of at least two of them. Ethylene and vinyl acetate are preferable most of all.

Composition ratio of the unsaturated epoxy compound and ethylenically unsaturated compound is not critical, but 0.1–50 % by weight, more preferably 1–30

% by weight of unsaturated epoxy compound is preferred.

The epoxy group-containing copolymer is prepared by various methods. Either random copolymerization or graft copolymerization may be effected; in the former, unsaturated epoxy compound is introduced in backbone chain of copolymer, and in the latter, unsaturated epoxy compound is introduced in side chain of copolymer. Examples are copolymerization in which unsaturated epoxy compound is allowed to react with ethylene in the presence of a radical initiator under 500-4000 atm. at 100-300° C. in the presence or absence of a solvent and a chain transfer agent; graft copolymerization in which polypropylene, unsaturated epoxy compound and a radical initiator are blended and allowed to melt in an extruder; and copolymerization in which unsaturated epoxy compound is allowed to react with ethylenically unsaturated compound in an inert solvent such as water or an organic solvent in the presence of a radical initiator.

An amount of these epoxy compounds is preferably 0.01-30 parts, preferably 0.01-20 parts by weight per 100 parts by weight of the composition of polyphenylene ether and polyamide. When less than 0.01 part by weight, the effects of this invention are small and when more than 30 parts by weight, gelation proceeds to deteriorate molding processability.

Preferred embodiments of this invention may be to use the resin composition in the form of reinforced composite materials with reinforcing fibers such as glass fiber, carbon fiber, polyamide fiber and metallic whisker and composite materials with addition of inorganic fillers or flame retardants such as silica, alumina, calcium carbonate, talc, mica, carbon black, $TiO_2$, ZnO and $Sb_2O_3$ and furthermore, lubricants, nuclear agents, plasticizers, dyes, pigments, antistatic agents, antioxidants, weatherability providing agents, etc.

Any process is used to prepare the present resin composition.

Melt-blending methods for the components are the best from an economical point of view, although it is possible to blend the components in a solution and evaporate the solvent or precipitate in a non-solvent. Melt-blending is carried out in a single-screw or a twin-screw extruder, a kneader or so, preferably a high-speed twin-screw extruder.

Before kneading, it is preferable to uniformly blend powder or pellets of the component resins in a tumbler or a Henschel mixer. The first blending above is not always necessary. Alternatively, each resin may be fed to a kneader through a metering apparatus. Resin composition, after kneaded, is molded according to injection, extrusion and the like. Alternatively, dry blending the resin materials at the injection or extrusion molding without prekneading and direct kneading are made in the melt processing to produce a shaped article. Any order is used in the kneading step. For example, compounds for (A) and (B), (C) and (D) are kneaded together, or compounds for (A), (B) and (C) are first kneaded before (D) is added. However, it is not desirable to knead compounds for (C) and (D) and then add compounds for (A) and (B), because gelation occurs and desirable resin composition is not produced. Any other orders may be used for three component system of (A), (B) and (C) or four component system of (A), (B), (C) and (D).

The resin composition of this invention is used as shaped articles, sheets, tubes, films, fibers, laminates, coating materials, etc. made by injection molding or extrusion molding, especially as automobile parts such as bumper, inverness, fender, trim, door panel, wheel cover, side protector, garnish, trunk lid, bonnet, roof, etc., interior and exterior materials and mechanical parts required to have heat resistance. Furthermore, the resin composition is used as parts for motor bicycles such as covering material, muffler cover, leg shield, etc. and electrical and electronic parts such as housing, chassis, connector, base for printed circuit, pulley and other parts required to have strength and heat resistance.

This invention is explained referring to examples below, wherein they are merely illustrative ones and this invention is not limited to them. Hardness test, heat distortion temperature test (H.D.T.), Izod impact strength test (3.2 mm thick) and M.I. are observed in accordance with JIS K7202, JIS K7207, JIS K7110 and JIS K7210, respectively.

Polyphenylene ether, maleic anhydride-grafted ethylene-propylene rubber, maleic anhydride-styrene-grafted ethylene-propylene rubber and epoxy compound used in the examples and comparative examples are obtained in the following manner. Epoxy resins for the epoxy compound which are commercially available are used.

/ Polyphenylene ether

In an autoclave of 10 l in capacity with jacket which is provided with a stirrer, a thermometer, a condenser and an air introducing pipe which reaches the bottom of the autoclave to make a homogeneous solution, are charged 3,420 g of xylene, 1,366 g of methanol, 1,222 g (10 mols) of 2,6-dimethylphenol and 24 g (0.6 mol) of sodium hydroxide. Thereafter, to the solution is added a solution prepared by dissolving 31.5 g (0.3 mol) of diethanolamine, 19.4 g (0.15 mol) of di-n-butylamine and 0.99 g (0.005 mol) of manganese chloride tetrahydrate. Then, while vigorously stirring the content, air is blown thereinto at a rate of 5 l/min. Reaction temperature and pressure are maintained at 85° C. and 9 kg/cm², respectively. The supply of air is stopped after lapse of 7 hours from the beginning of introduction and the reaction mixture is thrown into a mixture of 66 g (1.15 mol) of acetic acid and 4,900 g of methanol. The resulting slurry is filtered under reduced pressure to isolate wet polyphenylene ether. The isolated polyphenylene ether is washed with 7,200 g of methanol and then dried under reduced pressure at 150° C. overnight to obtain 1,179 g of dried polyphenylene ether, which has a reduced viscosity of 0.54 dl/g measured in chloroform of 0.5 g/dl at 25° C.

② Maleic anhydride-styrene grafted ethylene-propylene copolymer rubber

In a 2 l stainless steel autoclave is put 80 g of ES-PRENE ® E201 (ethylene-propylene rubber) or ES-PRENE ®E301 (ethylene-propylene non-conjugated diene rubber; Sumitomo Chemical Co., Ltd.) as an ethylene-α-olefin copolymer rubber, and thereto are added 8.0 g of maleic anhydride, 8.0 g of styrene and 1,400 ml of toluene. Then, the content is purged with nitrogen and then heated to 105° C. with stirring to obtain a homogeneous solution.

Then, to the solution is added 50 ml of a toluene solution containing 1.6 g of 1,1-bis(t-butylperoxy) 3,3,5-trimethylcyclohexane and reaction is effected at 105° C. for 1.5 hour with stirring in a nitrogen atmosphere.

After completion of the reaction, to the reaction mixture is added 50 ml of a toluene solution containing 0.8 g of 2,6-di-t-butyl-4-methylphenol and then polymer is precipitated with a large amount of acetone, collected by filtration and dried to obtain a maleic anhydride-modified rubber having 3.6% by weight of maleic anhydride grafted and a Mooney viscosity $Ms_{1+4}$ 121° C.) of 60.

This modified product is completely dissolved in warm xylene (100° C.) to find no gel formation. In the following examples, amount of maleic anhydride, that of styrene and that of peroxide were suitably changed depending on Examples and Comparative Examples.

③ Maleic anhydride-grafted ethylene-propylene copolymer rubber

This is prepared in the same manner as in the above ② except that styrene is not used. The resulting maleic anhydride-grafted ethylene-propylene copolymer rubber has 0.7% by weight of grafted maleic anhydride (based on rubber).

④ Epoxy compound

Glycidyl methacrylate-ethylene-vinyl acetate copolymer is prepared in accordance with Japanese Patent Publications (Kokai) 47-23490 and 48-113883. That is, 5.9 kg/hr of glycidyl methacrylate, 300 kg/hr of ethylene, 3.4 kg/hr of vinyl acetate, 30 g/hr of a radical initiator, t-butylperoxy-2-ethylhexanoate, and 1.0 g/hr of propylene as a chain-transfer agent are successively fed in a reactor (40 l) made of stainless steel whose temperature is controllable and which is equipped with an inlet, an outlet and a stirrer and copolymerization is effected with stirring under 1400–1600 atm. at 180–200° C. The resulting epoxy compound contains 10% by weight of glycidyl methacrylate, 85% by weight of ethylene and 5% by weight of vinyl acetate.

⑤ Polyamide

Polyamide 6,6: UBE Nylon ® 2020B having relative viscosity of 3.0 (Ube Industries, Ltd.)

Addition amount of maleic anhydride in the modified rubber is obtained by titration of a toluene solution of the modified rubber with an ethanolic KOH solution under heating using phenolphthalein as an indicator.

Addition amount of styrene is determined by making calibration by infrared analysis using a blend of ethylene-α-olefin rubber and styrene.

EXAMPLE 1

To 100 parts by weight of a resin composition comprising 50 wt% of polyamide 6,6 (UBE Nylon ® 2020B, relative viscosity 3.0) and 50 wt% of polyphenylene ether prepared in the above ① was added 11.1 part by weight of maleic anhydride-styrene-grafted ethylene-propylene copolymer rubber (modified rubber) prepared by grafting maleic anhydride and styrene on ESPRENE ® E301 (ethylene propylene non-conjugated diene rubber EPDM) prepared in the above ②. This mixture was melted and kneaded at 260° C. in a small batchwise twin-screw kneader ("LABOPLAST-MIL" ® of Toyo Seiki Co.) at a screw rotation of 90 rpm for 5 minutes. This modified rubber contained 3.6 wt% of grafted maleic anhydride and 4.0 wt% of grafted styrene on rubber.

The resulting composition was pressed at 280° C. to prepare test specimen for Izod impact test, heat distortion temperature test and Rockwell hardness test. Test results are shown in Table 1.

COMPARATIVE EXAMPLE 1

Example 1 was repeated except that ESPRENE ® E301 on which 3.6 wt% (based on rubber) of maleic anhydride was grafted was used as modified rubber. This modified rubber was greatly gelled and properties, especially impact strength was inferior. The test results are shown in Table 1.

EXAMPLE 2

Example 1 was repeated except that ESPRENE ® E201 (ethylene-propylene rubber EPM) on which 1.6 wt% (based on rubber) of maleic anhydride and 2.0 wt% (based on rubber) of sytrene were grafted was used as modified rubber. The results are shown in Table 1.

COMPARATIVE EXAMPLE 2

Example 1 was repeated except that ESPRENE ® E201 (ethylene-propylene rubber) on which 1.6 wt% (based on rubber) of maleic anhydride was grafted was used as modified rubber. The results are shown in Table 1.

These results indicate that in the case of EPDM, when maleic anhydride was grafted in a large amount, use of maleic anhydride alone caused gelation to deteriorate properties while when styrene was used in combination therewith, no gelation occurred and properties and fluidity were both superior. In the case of EPM, too, the use of maleic anhydride with styrene afforded higher heat resistance and better fluidity than the use of maleic anhydride without styrene

EXAMPLE 3

Example 2 was repeated except that 2.3 parts by weight of an epoxy compound (glycidyl methacrylate-ethylene copolymer, content of glycidyl group: 6 wt%) prepared in the above ④ was added to the system used in Example 2. The results are shown in Table 2.

COMPARATIVE EXAMPLE 3

Comparative Example 2 was repeated except that 2.3 parts by weight of an epoxy compound (glycidyl methacrylate-ethylene copolymer, content of glycidyl group, 6 wt%) was added to the system of Comparative Example 2. The results are shown in Table 2.

The two results also indicate that the use of maleic anhydride with styrene gave higher fluidity and impact strength than the use of maleic anhydride without styrene.

EXAMPLE 4

Example 2 was repeated except that the maleic anhydride-styrene-grafted EPM was replaced by the EPM on which 0.96 wt% (based on rubber) of maleic anhydride and 4.0 wt wt% (based on rubber) of styrene were grafted. The results are shown in Table 2.

EXAMPLE 5

Example 2 was repeated except that tho maleic anhydride-styrene-grafted EPM was replaced by the EPM on which 1.0 wt% (based on rubber) of maleic anhydride and 1.0 wt% (based on rubber) of styrene were grafted. The results are shown in Table 2.

EXAMPLE 6

Example 2 was repeated except that the maleic anhydride-styrene-grafted EPM was replaced by the EPM on which 0.96 wt% (based on rubber) of maleic anhydride and 15 wt% (based on rubber) of styrene were grafted. The results are shown in Table 2.

EXAMPLE 7

Example 2 was repeated except that the maleic anhydride-styrene-grafted EPM was replaced by the EPM on which 1.0 wt% (based on rubber) of maleic anhydride and 0.1 wt% (based on rubber) of styrene were grafted. The results are shown in Table 2.

an unsaturated carboxylic acid or anhydride thereof with an ethylene-α-olefin copolymer rubber or (b) the modified rubber (C) with an epoxy compound (D). Although, it has been difficult to improve the balance of properties and processability by using rubber modified with only unsaturated carboxylic acid or anhydride thereof, the resin composition of this invention is improved in properties and is better in processability and thus this composition has uses of wide variety. Further, the novel resin composition provided by this invention is easily processed into shaped articles, sheets and films by molding methods employed for thermoplastic resins such as injection molding, extrusion molding, etc., said molded products being very good in balance of properties such as heat resistance, impact resistance, hardness, etc. This resin composition is especially suitable for injection molding.

TABLE 1

|  | A Polyphenylene ether wt % | B Polyamide 6,6 wt % | C Modified ethylene propylene rubber Part by weight per 100 parts by weight of A + B | C Modified ethylene propylene rubber Addition amount to rubber (wt % based on rubber) | | Properties MI 280° C. 10 kg load | Properties Izod (notched) Kg cm/cm | Properties H.D.T. (18.6 Kg/cm² load) °C. | Properties Rockwell hardness R |
|---|---|---|---|---|---|---|---|---|---|
| Example 1 | 50 | 50 | Maleic anhydride-styrene-grafted rubber 11.1 | Maleic anhydride Styrene | 3.6 4.0 | 7.8 | 35.0 | 171.6 | 114 |
| Comparative Example 1 | 50 | 50 | Maleic anhydride-grafted rubber 11.1 | Maleic anhydride (gelled) | 3.6 | Unflowable | <3.0 | 127.4 | 115 |
| Example 2 | 50 | 50 | Maleic anhydride-styrene-grafted rubber 11.1 | Maleic anhydride Styrene | 1.6 2.0 | 5.3 | 23.0 | 152.2 | 109 |
| Comparative Example 2 | 50 | 50 | Maleic anhydride-grafted rubber 11.1 | Maleic anhydride | 1.6 | 1.4 | 25.3 | 137.2 | 113 |

TABLE 2

|  | A polyphenylene ether wt % | B polyamide 6,6 wt % | C Modified ethylene-propylene rubber Part by weight | C Modified ethylene-propylene rubber Addition amount to rubber (wt % based on rubber) | | D Glycidyl methacrylate-ethylene copolymer Part by weight | Properties MI 280° C. 10 Kg load | Properties Izod (notched) kg · cm/cm | Properties H.D.T. 18.6 kg/cm² load °C. | Properties Rockwell hardness R |
|---|---|---|---|---|---|---|---|---|---|---|
| Example 3 | 50 | 50 | Maleic anhydride-styrene-grafted rubber 11.1 | Maleic anhydride Styrene | 1.6 2.0 | 2.3 | 7.6 | 40.0 | 136.4 | 115 |
| Comparative Example 3 | 50 | 50 | Maleic anhydride-grafted rubber 11.1 | Maleic anhydride | 1.6 | 2.3 | <1.0 | 26.4 | 144.4 | 112 |
| Example 4 | 44.4 | 55.6 | Maleic anhydride-styrene-grafted rubber 11.1 | Maleic anhydride Styrene | 0.96 4.0 | — | 13.6 | 19.6 | 122.8 | — |
| Example 5 | 44.4 | 55.6 | Maleic anhydride-styrene-grafted rubber 11.1 | Maleic anhydride Styrene | 1.0 1.0 | — | 14.8 | 15.8 | 147.6 | — |
| Example 6 | 44.4 | 55.6 | Maleic anhydride-styrene-grafted rubber 11.1 | Maleic anhydride Styrene | 0.96 15 | — | 14.2 | 8.2 | 157.5 | — |
| Example 7 | 44.4 | 55.6 | Maleic anhydride-styrene-grafted rubber 11.1 | Maleic anhydride Styrene | 1.0 0.1 | — | 6.4 | 10.2 | 126.4 | — |

The resin composition of this invention comprises a composition of a polyphenylene ether and a polyamide with which is blended (a) modified rubber (C) obtained by copolymerizing an alkenyl aromatic compound and

We claim:

1. A thermoplastic resin composition which comprises 100 parts by weight of a composition comprising (A) 5-95% by weight of a polyphenylene ether prepared by oxidation polymerization of at least one phenol compound represented by the formula:

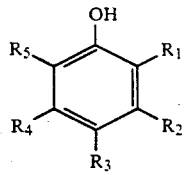

wherein $R_1$, $R_2$, $R_3$, $R_4$ and $R_5$ which may be identical or different and represent a hydrogen atom, a halogen atom, a substituted or unsubstituted hydrocarbon residue, with a proviso that at least one of them is a hydrogen atom and (B) 95-5% by weight of a polyamide, 5-100 parts by weight of (C) a copolymer of an ethylene-α-olefin copolymer rubber with an alkenyl aromatic compound and an unsaturated carboxylic acid or its anhydride, and 0.01-30 parts by weight of (D) an epoxy compound.

2. A thermoplastic resin composition according to claim 1 wherein the alkenyl aromatic compound is styrene.

3. A thermoplastic resin composition according to claim 1 wherein the unsaturated carboxylic acid or its anhydride is maleic anhydride and the alkenyl aromatic compound is styrene.

4. A thermoplastic resin composition according to claim 1 wherein addition amount of the unsaturated carboxylic acid or its anhydride is 0.3-5% by weight of the ethylene-α-olefin copolymer rubber.

5. A thermoplastic resin composition according to claim 1 wherein the weight ratio of the alkenyl aromatic compound and to the unsaturated carboxylic acid or its anhydride is 0.2-5.

6. A thermoplastic resin composition which comprises 100 parts by weight of composition consisting of essentially of (A) 5-95% by weight of a polyphenylene ether prepared by oxidation polymerization of at least one phenyl compound represented by the formula

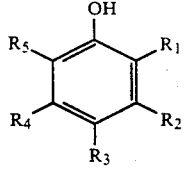

wherein $R_1$, $R_2$, $R_3$, $R_4$ and $R_5$, which may be identical or different, represent a hydrogen atom, a halogen atom, a substituted or unsubstituted hydrocarbon residue, with a proviso that at least one of them is a hydrogen atom and (B) 95-5% by weight of a polyamide, 5-100 parts by weight of (C) a copolymer of an ethylene-α-olefin copolymer rubber with an alkenyl aromatic compound and an unsaturated carboxylic acid or its anhydride, and 0.01-30 parts by weight (D) an epoxy resin.

7. A thermoplastic resin composition according to claim 6, wherein the alkenyl aromatic compound is styrene.

8. A thermoplastic resin composition according to claim 6, wherein the unsaturated carboxylic acid or its anhydride is maleic anhydride and the alkenyl aromatic compound is styrene.

9. A thermoplastic resin composition according to claim 6, wherein addition amount of the unsaturated carboxylic acid or its anhydride is 0.3-5% by weight of the ethylene-α-olefin copolymer rubber.

10. A thermoplastic resin composition according to claim 6, wherein the rate ratio of the alkenyl aromatic compound to the unsaturated carboxylic acid or its anhydride is 0.2-5.

11. A thermoplastic resin composition which comprises 100 parts by weight of a composition consisting of (A) 5-95% by weight of a polyphenylene ether prepared by oxidation polymerization of at least one phenyl compound represented by the formula

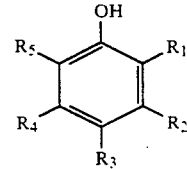

wherein $R_1$, $R_2$, $R_3$, $R_4$ and $R_5$, which may be identical or different, represent a hydrogen atom, a halogen atom, a substituted or unsubstituted hydrocarbon residue, with a proviso that at least one of them is a hydrogen atom and (B) 95-5% by weight of a polyamide, 5-100 parts by weight of (C) a copolymer of an ethylene-α-olefin copolymer rubber with an alkenyl aromatic compound and an unsaturated carboxylic acid or its anhydride, and 0.01-30 parts by weight (D) an epoxy group-containing copolymer.

12. A thermoplastic resin composition according to claim 11, wherein the alkenyl aromatic compound is styrene.

13. A thermoplastic resin composition according to claim 12, wherein the unsaturated carboxylic acid or its anhydride is maleic anhydride and the alkenyl aromatic compound is styrene.

14. A thermoplastic resin composition according to claim 11, wherein addition amount of the unsaturated carboxylic acid or its anhydride is 0.3-5% by weight of the ethylene-α-olefin copolymer rubber.

15. A thermoplastic resin composition according to claim 11, wherein the rate ratio of the alkenyl aromatic compound to the unsaturated carboxylic acid or its anhydride is 0.2-5.

* * * * *